(12) United States Patent
Kohnke et al.

(10) Patent No.: US 7,998,235 B2
(45) Date of Patent: Aug. 16, 2011

(54) METHOD FOR THE PRODUCTION OF UREA FERTILIZER WITH ELEMENTAL SULPHUR AND THE PRODUCT THEREOF

(75) Inventors: Sven Kohnke, Itzehoe (DE); Uwe Ladwig, Brunsbüttel (DE); Jürgen Maaz, Brunsbüttel (DE); Udo Stark, Kleve (DE)

(73) Assignee: Yara International ASA, Oslo (NO)

( * ) Notice: Subject to any disclaimer, the term of this patent is extended or adjusted under 35 U.S.C. 154(b) by 960 days.

(21) Appl. No.: 10/515,591

(22) PCT Filed: Jun. 17, 2002

(86) PCT No.: PCT/NO02/00214
§ 371 (c)(1),
(2), (4) Date: Dec. 30, 2004

(87) PCT Pub. No.: WO03/106376
PCT Pub. Date: Dec. 24, 2003

(65) Prior Publication Data
US 2005/0204792 A1    Sep. 22, 2005

(51) Int. Cl.
*C05C 9/00* (2006.01)
(52) U.S. Cl. .................................. 71/28; 71/27; 71/11
(58) Field of Classification Search .............. 71/28, 27, 71/11
See application file for complete search history.

(56) References Cited

U.S. PATENT DOCUMENTS

| 3,697,245 | A |   | 10/1972 | Dilday |       |
|-----------|---|---|---------|--------|-------|
| 4,026,695 | A |   | 5/1977  | Young  |       |
| 4,073,633 | A | * | 2/1978  | Young  | 71/28 |
| 4,330,319 | A | * | 5/1982  | Bexton et al. | 71/28 |
| 4,565,564 | A |   | 1/1986  | Backlund |     |
| 4,636,242 | A |   | 1/1987  | Timmons |      |
| 5,041,177 | A | * | 8/1991  | Hajto et al. | 149/5 |
| 5,112,379 | A | * | 5/1992  | Young  | 71/31 |
| 5,571,303 | A | * | 11/1996 | Bexton | 71/34 |

FOREIGN PATENT DOCUMENTS
EP     0255752    2/1988

OTHER PUBLICATIONS

ChemTutor; Acids and Bases; www.chemtutor.com/acid.htm.*
Database WPI, Week 199517, Derwent Publications Ltd., London, GB; Class A17, AN 1995-126054, & JP 7048194 A (Chisso Corp.), Feb. 21, 1995.

* cited by examiner

*Primary Examiner* — Jessica L Ward
*Assistant Examiner* — Erin Saad
(74) *Attorney, Agent, or Firm* — Wenderoth, Lind & Ponack L.L.P.

(57) ABSTRACT

The present invention relates to a method for the production of a urea fertilizer with elemental sulphur from sulphur in liquid stage and a liquid urea melt. The surface tension between the two phases of sulphur and urea are influenced in the liquid stage at temperatures above the melting points, by supply of an additive being temperature stable and amphoteric to the liquid sulphur/urea melt to obtain a homogeneous mixed phase, that subsequently is distributed and solidified. The invention also relates to a urea-sulphur fertilizer where the fertilizer comprises urea and elemental sulphur and an additive being temperature stable and amphoteric.

13 Claims, 5 Drawing Sheets

METHOD FOR THE PRODUCTION OF UREA FERTILIZER WITH ELEMENTAL SULPHUR AND THE PRODUCT THEREOF

The present invention relates to a process for the production of prilled urea with elemental sulphur and the product from said process.

Sulphur deficiency occurs widely in many parts of the world, notably where the soil is sandy, low in organic matter and subject to leaching. S deficiencies are increasing worldwide because of less use of single super phosphate which contains gypsum ($CaSO_4$) and more S is removed from fields due to increasing yields and declining soil reserves due to erosion and leaching. Also, in the industrialised countries emissions of sulphur dioxide ($SO_2$) from burning fossil fuels have provided a large S input to soil, as both rain and deposition of dust. With reduced emissions, deficiencies are increasing. Fertilizers enriched with S are now commonly used to correct S deficiencies.

Liquid sulphur can be a waste product from partial oxidation processes of heavy hydro-carbons for the production of hydrogen/ammonia or the desulphurization of natural gas. Together with available process $CO_2$ these raw materials are a prerequisite for the production of prilled urea, and instead of the well known urea sulphur fertilizers based on sulphates, like e.g. ammonium sulphate/calcium sulphate we would try to find a method for using elemental sulphur directly in molten stage as the source for molten sulphur in the production of nitrogen-sulphur plant nutrients.

Elemental sulphur is not directly plant available and cannot be used as a sufficient sulphur source for the production of S containing plant nutrients. Instead it has been used as a compound in fattening drum processes, where sulphur is sprayed in a drum on the surface of warm prills to form a closed shell around urea prills (sulphur coated urea, SCU) to establish a slow release, since urea is "sealed" to the environment by the shell. The humidity uptake can in this case only be realized by small cracks and urea is "leaking" being dissolved in the water from humidity uptake.

From U.S. Pat. No. 4,330,319 it is known a process for the production of a urea sulphur fertilizer. Urea and molten sulphur are mixed to obtain a molten mixture with subsequent solidification of the molten mixture to obtain a homogeneous, solid, particulate urea sulphur fertilizer wherein the sulphur has particle sizes smaller than about 100 µm. Molten urea and molten sulphur is passed through a mixing device at a temperature above the melting points to produce a finely divided sulphur dispersed in urea. The molten sulphur is added in amounts sufficient to produce said urea sulphur fertilizer. A pressure drop across said mixing device of at least 200 kPa is maintained to form a homogenized melt of urea and sulphur. Finally said homogenized melt is solidified by prilling or agglomeration.

In this patent strong mechanical forces are applied by a premixing with a T-piece, caused by a restricted orifice which creates turbulent flow due to the 90 degree angle of the two melt flows (T-piece) and the high pressure drop realized by the small diameter of the orifice. As a consequence the sulphur feed pump has to work at 5-9 bar range, in one example at 14 bar. A homogenizing static mixer is required to emulsify the S particles <100 µm. This homogenisation consumes further mechanical energy. Due to the fact that the two insoluble phases are only mixed mechanically, the recombination velocity of phase segments is very high (meta stable emulsion) and particles in the 10-30 µm range are only a minor part of the particle size distribution. The patent does not prove how the solidified emulsion improves the agronomic yield against S deficiency of the soil. It is necessary to use an anti caking agent to powder the prills against hygroscopicity of urea.

The main object of the present invention was to provide a method for emulsifying elemental sulphur in liquid stage into a liquid urea melt.

It was a further object of the invention to make elemental sulphur plant available as a S source at sufficient low particle sizes, and provide an additive which would make it possible to achieve particle sizes in a preferred range to increase the biological oxidation.

It was a further object to provide a urea-sulphur fertilizer without the need for an anti-caking agent.

It was a further object to reduce the ammonia volatilization losses from the urea-sulphur fertilizer.

It was a further object that the additive should be biodegradable, occurring as a natural compound in the environment in an ecological way.

It was a further object to obtain different S particle sizes as a function of the additive concentration, thus making the fertilizer adaptable for different climate conditions.

These and other objects of the invention are obtained by the method and product as described below. The invention is further defined and characterized by the patent claims.

The invention as claimed solves the problem of how to mix sulphur and urea in the melted state and provides S containing fertilizers having the desired particle size. Anti-caking agents are not necessary. An additive regulates the particle size distribution.

The method according to the present invention comprises emulsifying elemental sulphur in liquid stage into a liquid urea melt and influencing the surface tension between the two phases of sulphur and urea in the liquid stage at temperatures above the melting points by supply of an additive being temperature stable and amphoteric to the liquid sulphur/urea melt to obtain a homogeneously mixed phase.

It is preferred to emulsify elemental sulphur in liquid stage into a liquid urea melt. The agronomic reason for using elemental sulphur is that elemental sulphur can offer a higher nitrogen content in the fertilizer in the presence of high S concentrations, e.g. >42 wt % N at >8 wt % S. For most plant applications the N:S weight ratio is between 6:1 and 4:1, preferably around 5:1. For animal feed applications the N:S weight ratio is between 10:1 and 15:1.

The present invention differs from the fattening/S coating since the two main ingredients are not solid/liquid but both in the liquid stage. A stable emulsion cannot be achieved since the two liquids differ significantly in surface tension and density and separate thus immediately into two separate phases, even if the liquid phases are cooled down rapidly or even directly quenched by liquid nitrogen (−194° C.).

| | | | | |
|---|---|---|---|---|
| sulphur (140° C.): | density: | 1,787 kg/m³, | viscosity: | 0.008 Pas |
| urea (140° C.): | density: | 1,214 kg/m³, | viscosity: | 0.002 Pas |

In the literature it is published as common technique to use stirrers or static mixers to mix two compounds in liquid stage and be able to form an emulsion. The basic principle is the underlying mechanical force transmitted. This was tested both in technical and industrial scale, but the result was however in case of the mixed phase urea/liq. S, that the application of high efficient static mixers at industrial scale increased the separation velocity of the two phases, which was in direct contradiction to the general expectation.

As test pilot it was used a urea process after the traditional two stage vacuum system from the main melt pumps to the melt distribution system, in this case a rotating basket. The cooling/crystallization was established by unchanged ambient air cooling in the natural draft of prilling towers with 15/19 m diameter, starting at 60 m height. The supply of the second liquid phase, elemental sulphur (purity 99.9%) was installed by adding a feed tank including a speed controlled supply pump.

To enable the test of inorganic solid compounds which could be applied to serve as trace nutrients in conjunction with the base N-S grade prilled urea a solid dosing equipment was applied. To study the particle size distribution, sampling devices were applied following the process flow from the mixing point to the solidified prilled particle. Extensive measurements concerning particle size distribution of sulphur droplets in urea melt operated by the static mixers revealed why mechanical force was not able to increase the homogenity/stability of the mixed liquid phase. The dispersion speed/performance was not the driving factor for a homogenous phase with small S-droplet diameter, the process was instead directed by the recombination velocity/probability. Since the particle size distribution increased from the inlet to the outlet of the static mixer, pairs of S particles are offered a higher probability to recombinate in the static mixer.

The test pilot section (as specified above) was optimized towards shorter residence time, <180 sec from injection point until solid prill on the belt. It was also tested whether inorganic substances would influence the surface tension of the liquid dispersed sulphur phase and thereby influence the recombination probability and thus the particle size of the emulsified sulphur. Compounds of zinc, magnesium, calcium and boron were studied. Dissolved ZnO changed the colour of the mixed melt and influenced the surface tension in a positive way, the particle sizes achieved were <200 µm. ZnO, applied at 1-2% range was able to stabilize over a short residence time. ZnS and MgO were studied as additional trace compounds which could be dosed in a homogeneous liquid system without negative particle size effect. CaO, $CaSO_4$, $MgSO_4*4H_2O$ could be dosed causing some phase segregation, $Na_2B_4O_2$ and Borax remained suspended in the melt and were not homogeneously dispersed.

The concentration range of the inorganic compounds was 1.0-2.5%, preferably 1.5-2.1 weight %. Also compounds of copper, manganese, selenium and molybdenum can be suspended into the emulsion of urea and elemental sulphur without decomposition and adverse effect.

It was an object to provide a biodegradable compound which could influence the surface tension of the liquid S phase to realize a repelling effect high enough to stabilize small particles during the residence time of the test equipment at low additive concentrations <0.1 wt % additive. The particle range to be achieved should be in the range of 20-30 µm to increase the biological oxidation also in colder ambient condition. The compound should withstand a temperature level of 140° C. as required to keep the two phases in their liquid stage. The screening of substances was executed in lab scale by using an intensive stirrer and studying the particle size distribution for S as a function of time. Tests were executed covering a concentration range (0-150 ppm) of the finally preferred substance.

The group of straight chain fatty acids from $C_6$ to $C_{30}$ could serve as additives. It was found that the most preferred additive was myristic acid $C_{14}H_{28}O_2$, having a molecular weight of 228.36 g, melting point 58.8° C. and boiling point 199° C. Myristic acid is a natural derivative occurring as glycerine ester in nutmeg butter (70-80%) cocofat (20%) and sperm oil (15%). Calcium-Stearoyl-Lactate and Sodium-Stearoyl-Lactate were tested in the concentration range 100-1000 ppm, but these compounds decomposed and there was also a negative effect of foaming with said compounds. Dodecylamin and oleylamin were also tested, and a concentration of 1000 ppm gave particle sizes in the range of 100 µm. Also esters as isopropyl myristate and triglycerides, methyl ester glycerides could be suitable additives.

The particle size distribution of elemental sulphur could be modified through the concentration of the additive, and tests were performed to show this effect. The results are shown in Table 1.

TABLE 1

| Concentration of myristic acid ppm | Particle size of incorporated elemental S phase µm |
|---|---|
| 8 | 150 |
| 10 | 200 |
| 16 | 150 |
| 19 | 150 |
| 23 | 120 |
| 24 | 120 |
| 45 | 60 |
| 60 | 80 |
| 90 | 10 |
| 95 | 10 |
| 100 | 10 |
| 104 | 10 |
| 108 | 15 |
| 112 | 10 |
| 118 | 10 |
| 145 | 10 |
| 148 | 10 |
| 281 | 10 |

The process impact:
a particle size <50 µm of the elemental S particles has been realized at additive concentrations >75 ppm The smaller the particle size, the higher is the oxidation velocity by the oxidizing bacteria Thiobacillus Thiooxidans in the soil to convert the sulphur from the elemental stage to the plant available sulphate (at constant temperature, humidity, and species concentration):

| S elem. Sulphur | $(S_2O_3)^{2-}$ Thiosulphate | $(S_4O_6)^{2-}$ Tetrathionate | $(SO_4)^{2-}$ Sulphate |
|---|---|---|---|

Sulphur can thus be made plant available as a function of time (slow release). The sulphur deposit concentration cannot be lost during heavy rain (wash out effect) due to the insolubility of sulphur in its elemental stage.

Agronomic tests were launched to determine the S uptake by plants applying standard pot test technique in the greenhouse. The result was, that the biological oxidation velocity by the bacterium Thiobacillus was linked to the particle size. Bigger particle sizes realized slower oxidation velocity. The velocity as such was positively influenced at higher temperatures >25° C., as expected.

Agronomic tests and yield tests were also carried out in test field areas. The open field tests confirmed the expected strong relation between particle size and oxidation rate. The product was tested in fields in Germany and South Africa. The product grade applied was urea+elemental S: 42.7 wt % N, 8 wt % S, N:S weight ratio 5.3:1. The additive concentration was about 50 ppm. The average S particle size was 70 µm. Lower levels can be realized by increasing the additive concentration. Also higher S-concentrations can be obtained, reducing however the available N-content.

Ammonia volatilization losses from urea application are a concern especially in warmer climates due to lost nutrient content to the air. Since it could be expected from the biological oxidation in situ at the soil, that the conversion of elemental sulphur in the elemental stage to sulphate (reference is made to the above-mentioned chemical reaction type) would locally, in the micro environment of the μm S particle deposit, reduce the pH-level, the occurring ammonia losses were measured in comparison with normal prilled urea (without elemental S).

The method for the production of a urea fertilizer with elemental sulphur from sulphur in liquid stage and a liquid urea melt according to the present invention comprises influencing the surface tension between the two phases of sulphur and urea in the liquid stage at temperatures above the melting points, by supply of an additive being temperature stable and amphoteric to the liquid sulphur/urea melt to obtain a homogeneous mixed phase, that subsequently is distributed and solidified.

The additive may be present in concentrations of 5-300 ppm, preferably in concentrations of 45-100 ppm. The additive can comprise $C_6$-$C_{30}$ straight chain fatty acids, preferably the additive comprises myristic acid. Inorganic compounds of zinc and/or magnesium and/or calcium and/or boron may be added, also inorganic compounds of copper and/or manganese and/or selenium and/or molybdenum may be added to the liquid sulphur/urea melt. The inorganic compounds may be added in amounts of 1.0-2.5 weight %, preferably 1.5-2.1 weight %. The residence time from injection point until solid prill is <180 sec. The temperature is >140° C.

The urea-sulphur fertilizer according to the present invention comprises urea and elemental sulphur and an additive which is temperature stable and amphoteric. The additive may be present in concentrations of 5-300 ppm, preferably 45-100 ppm. The additive can comprise $C_6$-$C_{30}$ straight chain fatty acids, preferably the additive comprises myristic acid. The fertilizer may comprise inorganic compounds of zinc and/or magnesium and/or calcium and/or boron. The fertilizer may also comprise inorganic compounds of copper and/or manganese and/or selenium and/or molybdenum. The inorganic compounds can be present in amounts of 1.0-2.5 weight %, preferably 1.5-2.1 weight %. The particle size distribution for S is about 10-200 μM, preferably 50-90 μm. It is preferred that the particle size distribution for S is so that 90% of the particles are about 10 μm at additive concentrations >150 ppm.

The invention is further explained and envisaged in the following figures and examples.

| | |
|---|---|
| FIG. 1 | shows effect of urea and elemental sulphur (Urea + eS) on yield and sulphur content in oilseed rape compared with urea and urea/sulphur (UreaS) in two test fields in Germany. |
| FIG. 2 | shows effect of urea and elemental sulphur (Urea + eS) on yield and sulphur content in winter wheat compared with urea and urea/sulphur (UreaS) in a test field in Germany. |
| FIG. 3 | shows effect of urea and elemental sulphur (Urea + eS) on yield on oilseed rape compared with CAN (calcium ammonium nitrate), CAN + ASN (ammonium sulphate/ammonium nitrate) and urea in a test field in South Africa. |
| FIG. 4 | shows effect of urea and elemental sulphur (Urea + eS) on yield on maize compared with a super phosphate NPS fertilizer test grade 24-10-10 and urea in a test field in South Africa. |
| FIG. 5 | shows ammonia losses for urea and elemental sulphur (Urea + sS) from a test field in Germany (Hhof) and a test field in South Africa (RSA) compared with urea prills. |
| FIG. 6 | shows dust formation, abrasion resistance, crushing strength and caking index for urea, urea + S and urea + elemental S + additive (urea + S + Add.). |
| FIG. 7 | shows improvement on dust formation, caking index, abrasion resistance and crushing strength for urea + elemental S + additive (urea + S + Add.) compared with urea and urea + S. |

EXAMPLE 1

Experiments were carried out on oilseed rape in two test fields in Northern Germany with the addition of urea, urea+ammonium sulphate (urea+S) and urea+elemental sulphur (Urea+eS). The urea+elemental sulphur fertilizer used in the test comprised 42.7% N and 8% S, the additive concentration was 50 ppm, and the S particle size was about 70 μm. 36 kg/ha S was applied. The tests lasted for 3 days to a week. Yield and sulphur content in oilseed rape were measured and the results are shown in FIG. 1. FIG. 1 shows that for oilseed rape urea+elemental sulphur (urea+eS) and urea containing sulphate as ammonium sulphate (ureaS), give almost the same yield increase in the range of 6-20%. The temperature range was 7-15° C. GS 51 is the area code of the test field.

EXAMPLE 2

Experiments were carried out on winter wheat in a test field in Northern Germany with the addition of urea, urea+ammonium sulphate (ureaS) and urea+elemental sulphur (Urea+eS). The urea+elemental sulphur fertilizer used in the test comprised 42.7% N and 8% S, the additive concentration was 50 ppm and the S particle size was about 70 μm. 26 kg/ha S was added. The tests lasted for 3 days to a week. Yield and sulphur content in winter wheat were measured and the results are shown in FIG. 2. FIG. 2 shows that for winter wheat urea+elemental sulphur (Urea+eS) and urea+ammonium sulphate (ureaS) give almost the same yield effect of 7-8%. The temperature range was 7-15° C. GS 31 is the area code of the test field.

EXAMPLE 3

Experiments were carried out on oilseed rape in a test field in South Africa. For oilseed rape 10 kg/ha S was applied and urea+elemental sulphur (Urea+eS) was compared with CAN, CAN+ASN and urea. The results are shown in FIG. 3. FIG. 3 shows the yield for oilseed rape in t/ha for CAN, urea, urea+elemental sulphur (Urea+eS) and CAN+ASN.

EXAMPLE 4

Experiments were carried out on maize in a test field in South Africa. The S application was in general depending on the applied N/ha. Urea+elemental sulphur (Urea+eS) was compared with a super phosphate NPS fertilizer test grade 24-10-10 and urea. 58, 83 and 108 kg N/ha were added. For urea+elemental sulphur, the corresponding amounts of S added were 10, 14 and 18 kg S/ha, and for the NPS fertilizer 25, 35 and 45 kg S/ha were added. The results are shown in FIG. 4. FIG. 4 shows the yield for maize in kg/ha for urea+elemental sulphur (Urea+eS), NPS-fertilizer and urea.

At higher ambient temperatures in South Africa the yield increased by 14% for maize and oilseed rape responded with 71% yield increase.

EXAMPLE 5

Experiments on ammonia volatilization were carried out in a test field in North Germany (Hhof) and in a test field in South Africa (RSA). Ammonia losses from urea+elemental sulphur (Urea+eS) were measured at the two sites and compared with losses from urea prills, the results are shown in FIG. 5. The ammonia volatilization loss from urea+elemental S (Urea+eS) is reduced by about 15%, compared with prilled urea standard grade.

EXAMPLE 6

Dust formation, abrasion resistance, crushing strength and caking index were measured/calculated for urea, urea+S and urea+S+additive.

The dust formation, which is the sum of the free dust and the dust produced by abrasion, is defined as the loss in mass of a fertilizer in a spouting bed under specified conditions of time and air flow. The dust formation was determined by weighing the fertilizer before and after exposure to a flow of air in a spouting bed for a specific time.

The abrasion resistance is given as the percentage of broken grains after treatment in the abrasion resistance test. The abrasion resistance was determined by determination of the quantity of broken particles (fraction <1 mm for urea prills, fraction <1.6 mm for urea granules, fraction <1.5 mm for urea cattle feed) produced by introducing a grain sample in a cyclone making use of a controlled air flow.

The crushing strength (hardness) of grains is given by the force necessary to crush the grain as such. The crushing strength was determined by a test where individual grains were subjected to a measured force, applied by means of a metal plunger. The force (unit: kg force (kgf)) at which the grains fracture was taken as a measurement of strength.

The caking tendency of a fertilizer is the force (kgf) required to break a cake of compressed fertilizer. The compression of the sample is performed at a well defined temperature, force and in a well defined period. The caking tendency was determined by a test where a portion of fertilizer grains was brought in a mould and pressure was applied to the fertilizer by means of compressed air acting on a piston. After the sample had been under a pressure of 2 bar for 24 hours, the pressure was released. Top and bottom plate of the mould were removed. The pneumatic piston was reset to the top of the cake and pressure was increased progressively until the cake broke.

Figure 1:
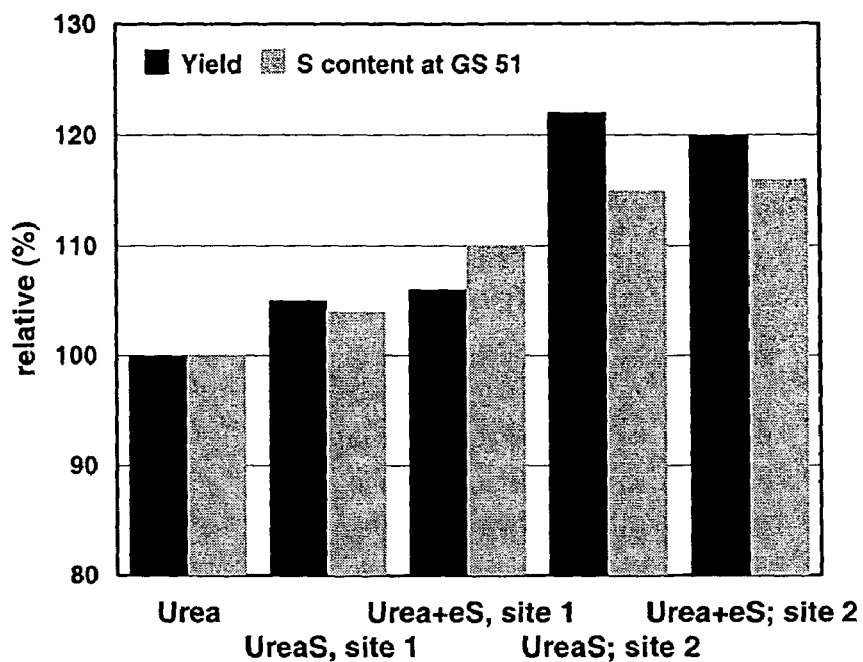
Figure 2:
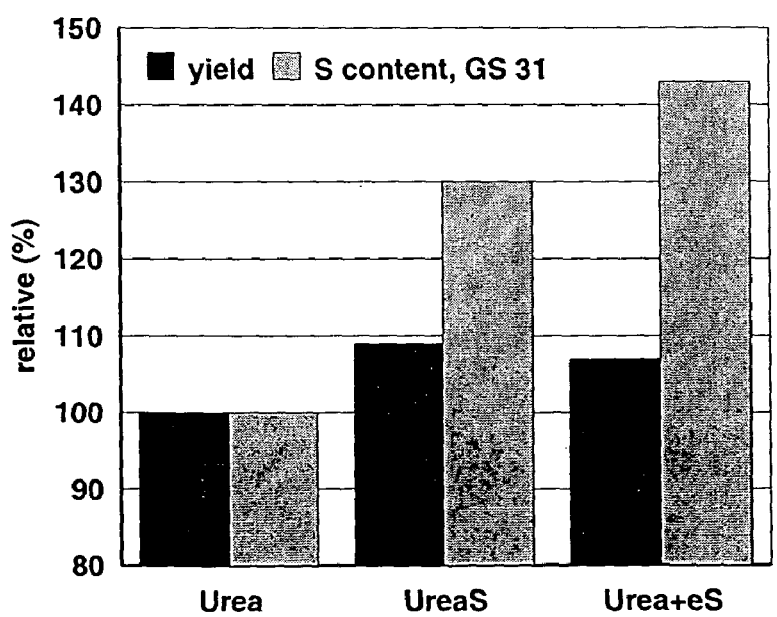
Figure 3:
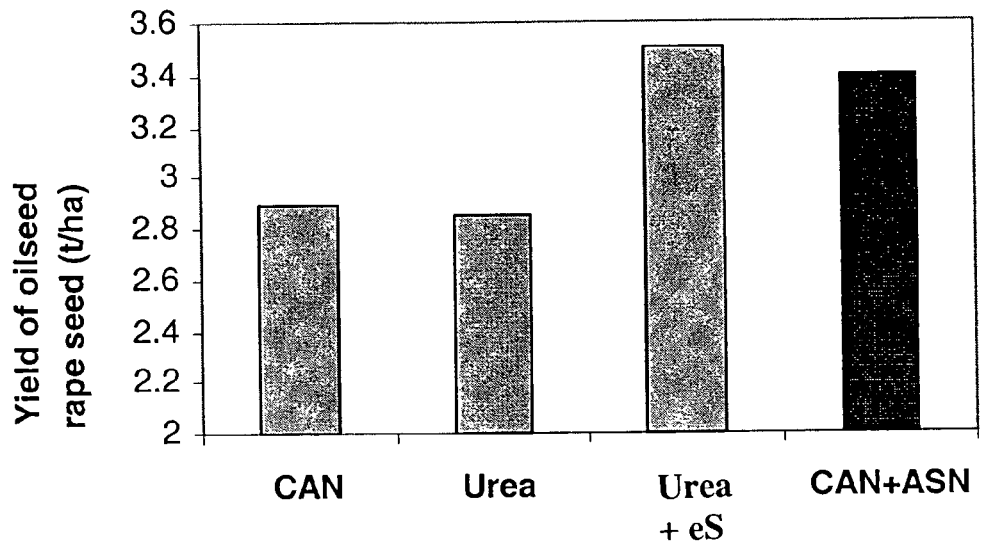
Figure 4:
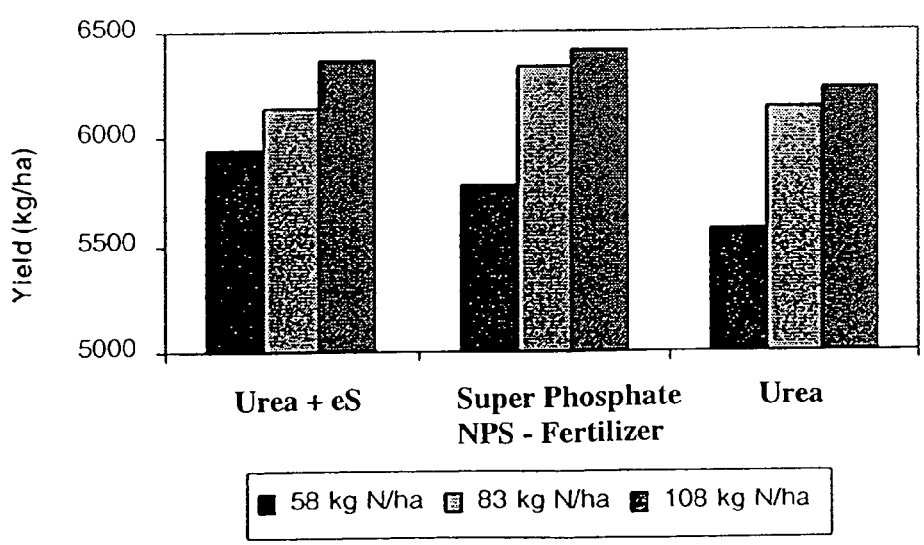
Figure 5:
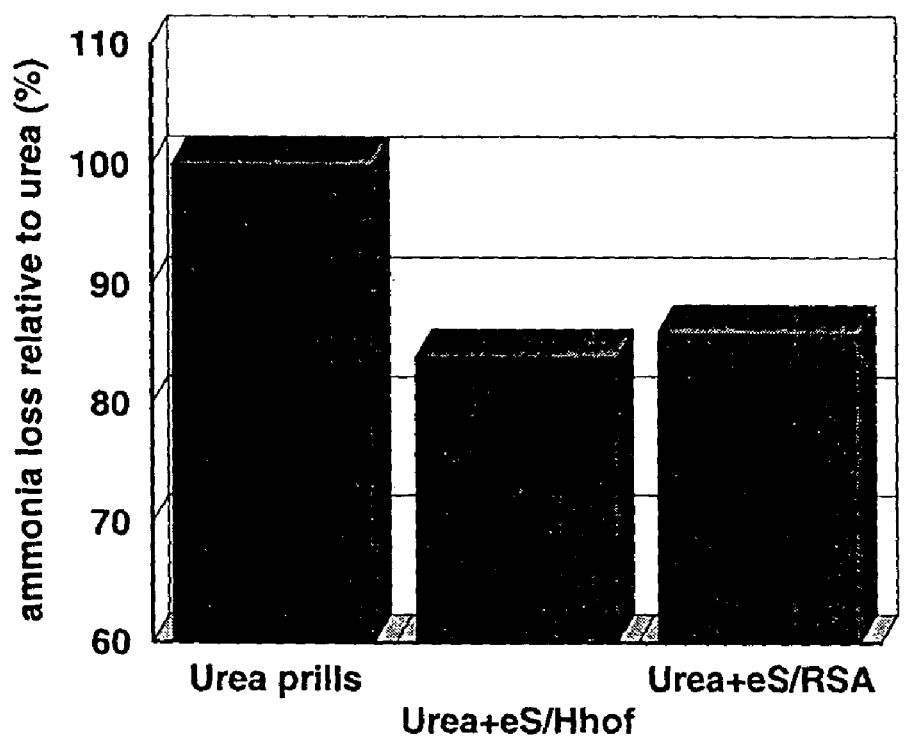
Figure 6:
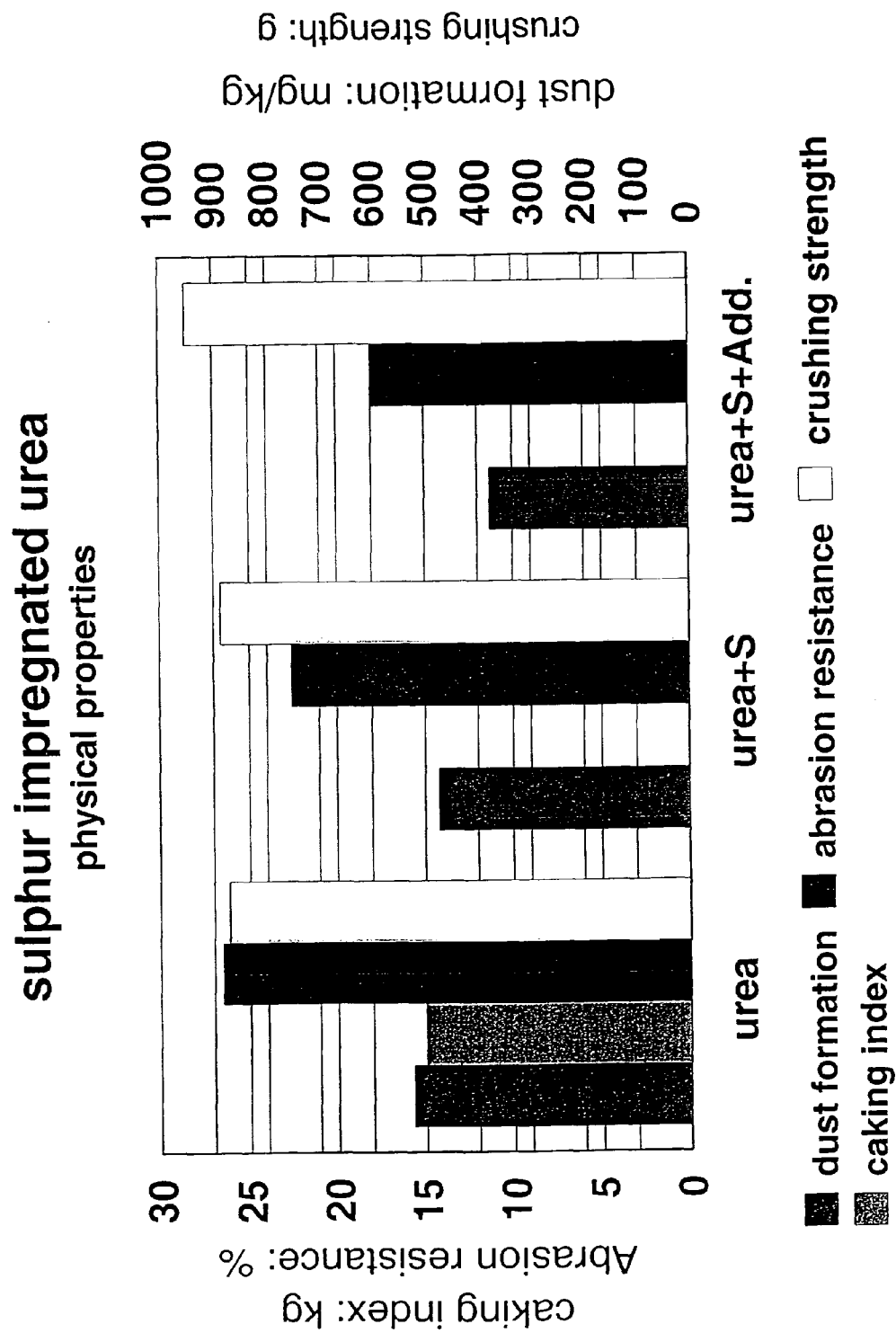
FIG. 6 shows dust formation (mg/kg), abrasion resistance (%), crushing strength (g) and caking index (kg) for urea, urea+S and urea+S+additive.
Figure 7:
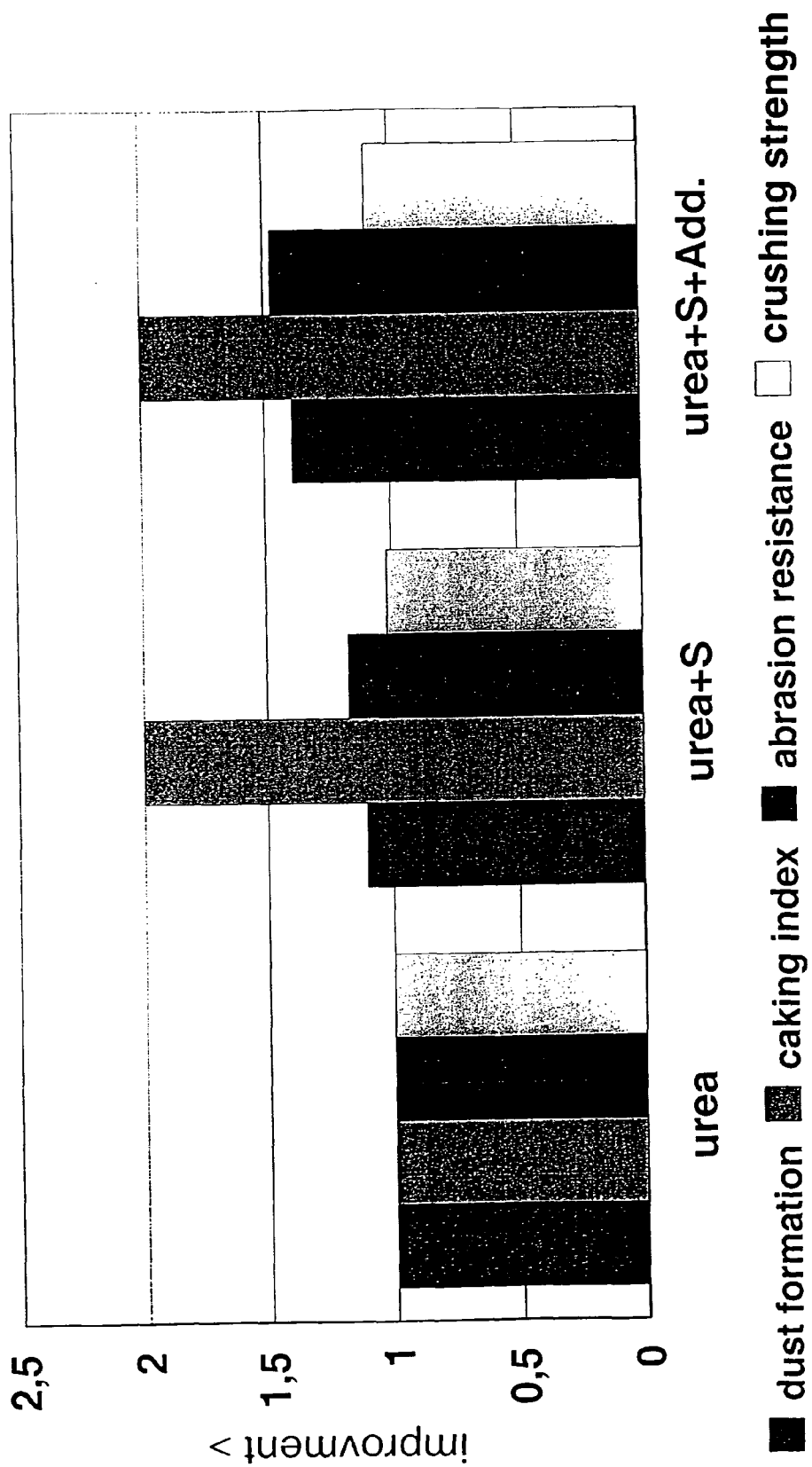
FIG. 7 shows improvement on dust formation, caking index, abrasion resistance and crushing strength for urea+S+additive compared with urea and urea+S.

The abrasive dust formation measured 10% of a normal standard prill.

The homogeneously integrated sulphur strongly reduces the hygroscopic behaviour of the urea matrix, thus reducing the caking tendency of urea. The product makes free application possible. Different S concentration levels covering the optimal N:S ratios for plants or animal rumens can be realized in the prill matrix. (N:S=5:1 or 10:1 respectively).

The impact of the biological oxidation is reducing the volatilization losses of ammonia. Due to the small particle sizes a high degree of integration in the crystal structure of the urea matrix is achieved, increasing the mechanical strength of the prill against external impact.

Application as a formaldehyde free N/S compound for plant nutrients or feed grade is possible. Due to the slow release and the insolubility of sulphur in the elemental stage, the S amount applied is protected against wash out losses in case of heavy rain.

By the present invention elemental sulphur can be made plant available as S source at sufficient low particle sizes. By influencing the surface tension between the two phases (urea/sulphur) in the liquid stage at temperatures above the melting points different particle sizes can be realized also in the low $\mu$m range. A temperature stable compound with amphoteric characteristics has been evaluated and applied to enable formation in the 10-50 $\mu$m range at low additive concentrations. The molecule structure of the applied surface active compound is biodegradable to avoid upgrading in the soil in case of continuos plant nutrient applications in the field. The additive may be applied in concentrations which enable to define a S particle range which also controls the oxidation velocity, and thus the S supply as micro biological oxidized sulphate to the plant roots. It is possible to obtain a product which is free flowing without surface coatings or conditioning with formaldehyde.

The invention claimed is:

1. Urea-sulphur fertilizer which comprises a homogeneously mixed phase of urea, elemental sulphur and an additive, wherein the additive is a $C_6$-$C_{30}$ straight chain fatty acid or ester thereof and is biodegradable, temperature stable and amphoteric.

2. Urea-sulphur fertilizer according to claim 1, wherein the additive is present in a concentration of 5-300 ppm.

3. Urea-sulphur fertilizer according to claim 2, wherein the additive is present in a concentration of 45-100 ppm.

4. Urea-sulphur fertilizer according to claim 1, wherein the additive comprises myristic acid.

5. Urea-sulphur fertilizer according to claim 1, wherein the fertilizer further comprises inorganic compounds of zinc and/or magnesium and/or calcium and/or boron.

6. Urea-sulphur fertilizer according to claim 1, wherein the fertilizer further comprises inorganic compounds of copper and/or manganese and/or selenium and/or molybdenum.

7. Urea-sulphur fertilizer according to claim 5, wherein the inorganic compounds are present in an amount of 1.0-2.5 weight %.

8. Urea-sulphur fertilizer according to claim 1, wherein the sulphur has a particle size distribution of about 10-200 $\mu$m.

9. Urea-sulphur fertilizer according to claim 8, wherein the particle size distribution for sulphur is 50-90 $\mu$m.

10. Urea-sulphur fertilizer according to claim 8, wherein the particle size distribution for sulphur is so that 90% of the particles are about 10 $\mu$m at additive concentrations >150 ppm.

11. Urea-sulphur fertilizer according to claim 6, wherein the inorganic compounds are present in an amount of 1.0-2.5 weight %.

12. Urea-sulphur fertilizer according to claim 7, wherein the inorganic compounds are present in an amount of 1.5-2.1 weight %.

13. Urea-sulphur fertilizer according to claim 11, wherein the inorganic compounds are present in an amount of 1.5-2.1 weight %.

* * * * *